United States Patent
Rao et al.

(10) Patent No.: US 11,636,677 B2
(45) Date of Patent: Apr. 25, 2023

(54) SYSTEMS, DEVICES AND METHODS FOR DISTRIBUTED HIERARCHICAL VIDEO ANALYSIS

(71) Applicants: Varshanth Ravindra Rao, North York (CA); Peng Dai, Markham (CA); Hanwen Liang, Thornhill (CA); Md Ibrahim Khalil, Toronto (CA); Juwei Lu, North York (CA)

(72) Inventors: Varshanth Ravindra Rao, North York (CA); Peng Dai, Markham (CA); Hanwen Liang, Thornhill (CA); Md Ibrahim Khalil, Toronto (CA); Juwei Lu, North York (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 101 days.

(21) Appl. No.: 17/145,219

(22) Filed: Jan. 8, 2021

(65) Prior Publication Data
US 2022/0222469 A1 Jul. 14, 2022

(51) Int. Cl.
| | |
|---|---|
| G06K 9/68 | (2006.01) |
| G06K 9/70 | (2006.01) |
| G06V 20/40 | (2022.01) |
| G06K 9/62 | (2022.01) |
| G06V 10/764 | (2022.01) |
| G06V 30/19 | (2022.01) |

(52) U.S. Cl.
CPC ........... *G06V 20/41* (2022.01); *G06K 9/6282* (2013.01); *G06V 10/764* (2022.01); *G06V 30/19173* (2022.01)

(58) Field of Classification Search
None
See application file for complete search history.

(56) References Cited

U.S. PATENT DOCUMENTS

| | | | | |
|---|---|---|---|---|
| 7,949,050 | B2* | 5/2011 | Xu | G06V 20/49 |
| | | | | 348/700 |
| 9,953,222 | B2* | 4/2018 | Shetty | G06V 20/41 |
| 10,867,183 | B2* | 12/2020 | Shetty | G06F 16/7834 |
| 10,965,999 | B2* | 3/2021 | Pappu | H04N 21/8456 |
| 11,270,123 | B2* | 3/2022 | Sureshkumar | H04N 21/26603 |

(Continued)

FOREIGN PATENT DOCUMENTS

CN 112052689 A 12/2020

OTHER PUBLICATIONS

Piacenza et al., "Generating story variants with constrained video recombination." In Proceedings of the 19th ACM international conference on Multimedia, pp. 223-232. 2011. (Year: 2011).*

(Continued)

*Primary Examiner* — Feng Niu

(57) ABSTRACT

System and method of analyzing a video, comprising dividing the video into a set of successive basic units; generating semantic tags for the basic units using a set of hierarchical classifier nodes that comprise a parent classifier node and a plurality of child classifier nodes, wherein the basic units are each routed through selected child classifier nodes based on classification of the basic units by the parent classifier node; and generating a semantic topic for the video based on the semantic tags generated for the basic units.

18 Claims, 11 Drawing Sheets

(56) References Cited

U.S. PATENT DOCUMENTS

| | | | | |
|---|---|---|---|---|
| 11,314,970 | B1* | 4/2022 | Swaminathan | G11B 27/06 |
| 2007/0201558 | A1* | 8/2007 | Xu | G06V 20/49 |
| | | | | 348/700 |
| 2011/0258188 | A1 | 10/2011 | Abdalmageed et al. | |
| 2014/0136186 | A1* | 5/2014 | Adami | H04N 21/8541 |
| | | | | 704/9 |
| 2016/0070962 | A1* | 3/2016 | Shetty | G06V 20/46 |
| | | | | 382/225 |
| 2016/0307067 | A1 | 10/2016 | Filimonova | |
| 2016/0364419 | A1* | 12/2016 | Stanton | G06N 3/08 |
| 2016/0379091 | A1 | 12/2016 | Lin et al. | |
| 2020/0204879 | A1* | 6/2020 | Pappu | H04N 21/23418 |
| 2020/0210396 | A1* | 7/2020 | Stanton | G06F 16/41 |
| 2020/0372073 | A1 | 11/2020 | Dahl et al. | |
| 2021/0117685 | A1* | 4/2021 | Sureshkumar | G06F 40/30 |
| 2022/0076023 | A1* | 3/2022 | Shin | G06K 9/6219 |

OTHER PUBLICATIONS

Hoogs et al., "Video content annotation using visual analysis and a large semantic knowledgebase," 2003 IEEE Computer Society Conference on Computer Vision and Pattern Recognition, 2003. Proceedings., 2003, pp. II-II, doi: 10.1109/CVPR.2003.1211487. (Year: 2003).*

Xu et al., "Discovery of Shared Semantic Spaces for Multiscene Video Query and Summarization," in IEEE Transactions on Circuits and Systems for Video Technology, vol. 27, No. 6, pp. 1353-1367, Jun. 2017, doi: 10.1109/TCSVT.2016.2532719. (Year: 2016).*

Soltanian et al., "Spatio-temporal VLAD encoding of visual events using temporal ordering of the mid-level deep semantics." IEEE Transactions on Multimedia 22, No. 7 (2019): 1769-1784. (Year: 2019).*

Imran et al., "Semantic Tags for Lecture Videos," 2012 IEEE Sixth International Conference on Semantic Computing, 2012, pp. 117-120, doi: 10.1109/ICSC.2012.36. (Year: 2012).*

Chen et al., "A Novel Video Summarization Based on Mining the Story-Structure and Semantic Relations Among Concept Entities," in IEEE Transactions on Multimedia, vol. 11, No. 2, pp. 295-312, Feb. 2009, doi: 10.1109/TMM.2008.2009703. (Year: 2009).*

Yin et al., "Encoded Semantic Tree for Automatic User Profiling Applied to Personalized Video Summarization," in IEEE Transactions on Circuits and Systems for Video Technology, vol. 28, No. 1, pp. 181-192, Jan. 2018, doi: 10.1109/TCSVT.2016.2602832. (Year: 2018).*

Yeung et al., "Time-constrained clustering for segmentation of video into story units." In Proceedings of 13th International Conference on Pattern Recognition, vol. 3, pp. 375-380. IEEE, 1996. (Year: 1996).*

Shen et al., "What's next? emergent storytelling from video collection." In Proceedings of the SIGCHI Conference on Human Factors in Computing Systems, pp. 809-818. 2009. (Year: 2009).*

Krause et al., "A Hierarchical Approach for Generating Descriptive Image Paragraphs," 2017 IEEE Conference on Computer Vision and Pattern Recognition (CVPR), 2017, pp. 3337-3345, doi: 10.1109/CVPR.2017.356. (Year: 2017).*

Yao et al., "I2T: Image Parsing to Text Description," in Proceedings of the IEEE, vol. 98, No. 8, pp. 1485-1508, Aug. 2010, doi: 10.1109/JPROC.2010.2050411. (Year: 2010).*

Lin, B, et al. "NeXtVLAD: An Efficient Neural Network to Aggregate Frame-level Features for Large-scale Video Classification", ECCVW 2018 Nov. 12, 2018.

Wu, Zuxuan et al. "Deep Learning for Video Classification and Captioning." Frontiers of Multimedia Research: 3-29. Crossref. Web Feb. 22, 2018.

A. Karpathy et al. "Large-Scale Video Classification with Convolutional Neural Networks," IEEE Conference on Computer Vision and Pattern Recognition, Columbus, OH, 2014, pp. 1725-1732, doi: 10.1109/CVPR.2014.22 2014.

Vicol, P. et al. "MovieGraphs: Towards Understanding Human-Centric Situations from Videos" 2018 IEEE/CVF Conference on Computer Vision and Pattern Recognition Apr. 15, 2018.

Weiss, N. "Hierarchical Classification with Local Classifiers: Down the Rabbit Hole", Towards Data Science Jan. 20, 2020.

Babbar, R. et al. "On Flat versus Hierarchical Classification in Large-Scale Taxonomies" Advances in Neural Information Processing Systems Dec. 2013.

Document: JVET-O0116-v3, Maxim Sychev et al., CE11-4: Distributed decoding refresh DDR, Joint Video Experts Team (JVET) of ITU-T SG 16 WP 3 and ISO/IEC JTC 1/SC 29/WG 11, 15th Meeting: Gothenburg, SE, total 4 pages. Jul. 2019.

* cited by examiner

SYSTEMS, DEVICES AND METHODS FOR DISTRIBUTED HIERARCHICAL VIDEO ANALYSIS

FIELD

The present application relates to systems, devices and methods for distributed hierarchical video analysis, and in particular to automated labelling of videos using artificial intelligence based classification models.

BACKGROUND

With the burgeoning usage of social media and improvements in camera technology, especially in the context of smartphone devices, videos have become a core form of disseminating entertainment, education and awareness.

Every minute, hundreds of hours or more of new video content is uploaded to social media based video sharing and streaming platforms. To complement content dissemination, video platforms apply semantic single word labels (e.g., "single labels") and semantic multi-word descriptive labels (e.g., "topical captions") to videos. For example, single labels such as "kitchen" and "cake" can be applied that describe general subjects that appears in a video segment. A topical caption such as "Instructions for baking a carrot cake" can enrich a single label to capture the concept of a video.

Correct labelling of videos can be expensive and time consuming. In some known solutions, artificial intelligence (AI) based models and or human workers can be used to apply labels to videos. AI based systems that can provide video labeling include solutions that analyze videos in a spatiotemporal manner, including for example solutions that employ Convolution Neural Networks (CNNs), Recurrent Neural Networks (RNNs), Long Short-Term Memories (LSTMs) and/or Transformer.

Some AI labelling solutions treat videos as individual segments and aggregate information in a simple manner like the Bag of Words/Frames methods applied in Vector of Locally Aggregated Descriptor (VLAD) feature encoding based systems such as NetVLAD and NeXtVLAD.

Known AI based video labelling solutions can suffer from two challenges: (1) perform labelling and captioning in the context of the ever increasing need for more specific single labels and more specific semantic topics in the view of the explosive amount of video contact that is becoming available; and (2) provide such labelling in a computationally efficient manner that can be practically deployed.

AI based solutions that employ models trained on datasets targeting small scale tasks may perform well for those tasks. However, such small scale solutions can be inadequate for video platform level systems that involve large scale classification tasks, where the label set is not only large but semantically stressful, subjective or confusing (such as identifying Funny videos or distinguishing a Child Entertainment video from a Child Educational video).

Hierarchical classification systems can be used to break labelling tasks down, however known hierarchical solutions operate on a simplistic level wherein all the components involved in the hierarchy are usually homogenous monolithic (single AI ecosystem) classifiers.

Accordingly, there is a need for a video analysis system that can be configured to provide semantic labeling for videos in a computationally effective manner.

SUMMARY

According to a first example aspect, a computer implemented method of analyzing a video is disclosed, comprising: dividing the video into a set of successive basic units; generating semantic tags for the basic units using a set of classifier nodes; and generating a semantic topic for the video based on the semantic tags generated for the basic units.

In one or more of the preceding examples, the set of classifier nodes comprises a set of hierarchical classifier nodes that have a parent classifier node and a plurality of child classifier nodes, and wherein generating semantic tags for the basic units further comprises that the basic units are each routed through selected child classifier nodes based on one or more predefined routing logic.

The use of a hierarchical classifier node structure can enable a complex classification operations to be broken down into set of smaller classification operations, each of which can be performed by a respective classifier node. The classifier nodes can be specialized for specific classification operations. As a consequence, in some applications, the hierarchical classifier can enable the use of more computationally efficient, specialized nodes that can require fewer computations and less computational memory than more generalized classifiers may. The accuracy of the semantic topics that are predicted may also be improved.

In some examples of the first aspect, the child classifier nodes include a first child classifier node configured to determine first semantic tags for a first subset of one or more of the basic units based on audio data included in the basic units of the first subset, and a second child classifier node configured to determine second semantic tags for a second subset of one or more basic units based on image data included in the basic units of the second subset, and the basic units are selectively routed for semantic tagging to either the first child classifier node or to the second child classifier node based on the classification of the basic units by the parent classifier node.

This enables basic units to be selectively routed, based on classification by the parent node, either to a classifier node that specializes in and is computationally efficient at generating semantic tags based on audio data or to a classifier node that specializes in and is computationally efficient at generating semantic tags based on image data.

In one or more of the preceding examples, the set of hierarchical classifier nodes comprise a plurality of different types of classifier nodes.

In one or more of the preceding examples, the set of hierarchical classifier nodes are distributed among multiple computer devices, and generating the semantic tags foe the basic units comprises selectively routing the basic units to selected computer devices and receiving at least some of the semantic tags from the selected computer devices.

Such a configuration can enable optimized computing platforms to be used for each of the respective classifier nodes, and also allow the classifier nodes to be shared by different hierarchical classifiers.

In one or more of the preceding examples, the set of hierarchical classifier nodes includes a first classifier node that receives at least a first basic unit of the basic units, the first classifier node comprises: multiple classifier models that are each configured to generate a respective semantic label for the first basic unit, and generating sematic tags for the basic units comprises determining a first semantic tag for the first basic unit based on one or more of the respective semantic labels generated by one or more of the multiple classifier models.

Such a method enables classifier nodes to each include a set of specialized classifier models that collectively can be used to improve accuracy of the classifier node, and thereby optimize performance of the computational system that is implementing the method.

In one or more of the preceding examples, the multiple classifier models include a first classifier model configured to generate a first respective semantic label for the first basic unit based on audio data included in the first basic unit, and a second classifier model configured to generate a second respective semantic label for the first basic unit based on image data included in the first basic unit.

In one or more of the preceding examples, each of the multiple classifier models is configured to generate, for the first basic unit, a plurality of possible candidate semantic labels each having an associated confidence value, wherein the integration logic determines the semantic tag for the first basic unit based on one or more of: (i) the candidate semantic label generated by all of the multiple classifier models having the highest overall associated confidence value; (ii) the candidate semantic label generated by all of the multiple classifier models having the highest average associated confidence value; (iii) the candidate semantic label generated by all of the multiple classifier models having the highest overall associated confidence value at a majority of the multiple classifier models.

In one or more of the preceding examples, the first classifier model of the multiple classifier models is configured to generate, for the first basic unit, a candidate semantic label having an associated confidence value, and when the associated confidence value is determined to meet a defined threshold value, determining the first sematic tag comprises selecting the candidate semantic label as the first semantic tag for the first basic unit, and when the associated confidence value is determined to not meet the defined threshold value, determining the first sematic tag comprises routing the first basic unit to at least a second classifier model of the multiple classifier models to generate, for the first basic unit, one or more further candidate semantic labels and determining the first semantic tag is based on the one or more further candidate semantic labels.

Such a method can be computationally efficient as other classifier models of a classifier node are only called on if the confidence level of the label generated by the first classifier model falls below a threshold.

In one or more of the preceding examples, the method includes, for each respective basic unit, tracking an identity of each of the classifier nodes that the respective basic unit has been routed through and the semantic tags determined for the respective basic unit by the classifier nodes that the respective basic unit has been routed through.

Such a method enables down-stream processes and post-tagging analysis to evaluate what nodes and models generated what sematic tags, which may for example be used to improve accuracy and/or optimize efficiency.

In one or more of the preceding examples, the method includes comprising generating a knowledge graph representing one or more of the basic units, the knowledge graph including information about the semantic tags and time stamps associated with the semantic tags.

In one or more of the preceding examples, the method includes generating a semantic topic for the video comprises comparing the knowledge graphs with a database of known query graphs that each have an associated semantic topic.

According to a second example aspect, a video analysis system is disclosed that includes a computation module that is configured for: dividing a video into a set of successive basic units; generating semantic tags for the basic units using a set of classifier nodes; and generating a semantic topic for the video based on the semantic tags generated for the basic units.

In one or more of the preceding examples, the set of classifier nodes comprises a set of hierarchical classifier nodes that have a parent classifier node and a plurality of child classifier nodes, and wherein generating semantic tags for the basic units further comprises that the basic units are each routed through selected child classifier nodes based on one or more predefined routing logic In some examples, the computation module includes a hierarchical classification manager module that is preconfigured with hierarchical architecture data that defines a hierarchical organization of the set of hierarchical classifier nodes and defines routing logic for routing the basic units through selected child classifier nodes, the hierarchical classification manager module being configured to route the basic units through selected child classifier nodes based on the hierarchical architecture data.

According to a third example aspect, a non-transitory computer readable memory or computer readable medium storing software instructions are disclosed for configuring a an execution device to analyze a video by: dividing the video into a set of successive basic units; generating semantic tags for the basic units using a set of classifier nodes; and generating a semantic topic for the video based on the semantic tags generated for the basic units.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
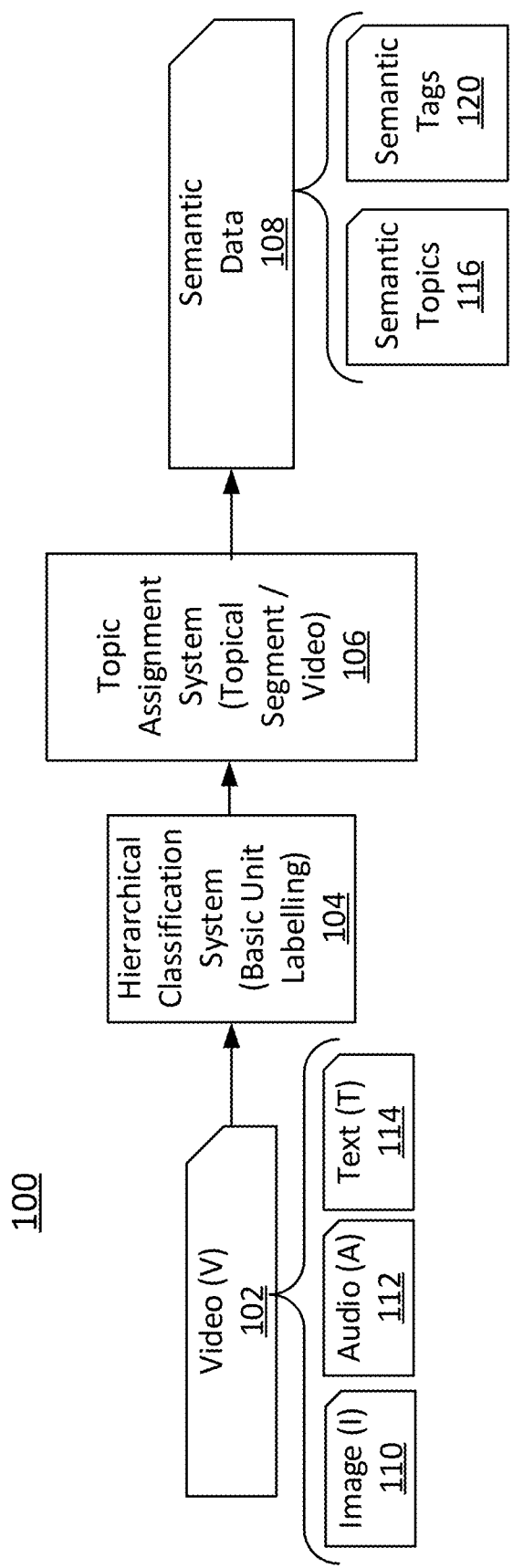
FIG. 1 shows a block diagram of a video analysis system accordingly to an example embodiment.

FIG. 1 shows a block diagram of a video analysis system 100 accordingly to an example embodiment. The video analysis system 100 is configured to receive an input video 102 and process the video 102 to generate semantic data 108 that can include semantic topics 116 and semantic tags 120. In this disclosure, semantic topic 116 can refer to a group of text words that describe a primary concept of a video or a segment of the video. A semantic topic 116 will typically include multiple-words, for example "Baking a Cake". In this disclosure, a semantic tag can refer to a simple label, for example a word, that describes an element that is present in a part of a video, for example "Cake".

Video 102 may include multiple data modalities, including at least image data 110 that defines a set of successive image frames that can be displayed on a viewing device. Typically, video 102 may also include audio data 112 that is synchronized with the image data 110. Video 102 may also include text data 114 that has been provided by a pre-processing system, such as a closed captioning system, based on audio data 112. In various examples, video 102 includes metadata that indicates, among other things, a file size, duration, creation date and resolution.

Video 102 may be a will typically include content that can grouped into one or more topical segments, with each segment relating to a single topic or subject. In this disclosure, a "topical segment" can refer to a portion of a video that can be assigned a semantic topic 116 that describes the primary concept of the segment. In many examples, video 102 may include just one topical segment, for example the entire video can be topically described by the semantic topic "Dog Fetches Toy". However, in some examples, video 102 may be a multi-topic video that includes multiple video segments that each pertain to an individual topic that requires an independent semantic topic 116 to accurately describe the video content. For example, a video that is a compilation of pets tricks could include a first topical segment that can be described by a descriptive semantic topic "Dog Fetches Toy" and a second topical segment that can be described as by a descriptive semantic topic "Talking Parrot". Accordingly, video 102 can include one or more topical segments.

Accordingly, label metadata 108 generated by video analysis system 100 can include descriptive video-level semantic topics 116 that describes a concept or subject of the entire video 102 (e.g., "Baking a carrot cake"). In some examples where video 102 includes multiple topical segments, (e.g., a multi-topic video), video metadata 108 can include a video-level semantic topic 116 (e.g., "World News") and also segment-level semantic topics 116 that are mapped (e.g., by timing data or frame number) to the respective topical segments of the video 102 (e.g., "US presidential election results": minutes 1:01 to 5:02; "Tropical Storm in Philippines": minutes 5:03 to 7:08). Semantic tags 120 can include semantic single labels (e.g., "tree"; "water") applied to elements that are included in basic units of the video 102.

As will be explained in greater detail below, video analysis system 100 is configured to split the tasks of generating semantic tags 120 and semantic topics 116. In the illustrated example, a hierarchical classification system 104 is used to generate basic unit semantic tags 120 based on one or more of the image, audio and text data 110, 112 and 114 included in video 102. A topic assignment system 106 is used to generate semantic topics 116 at the video and topical segment levels based on the semantic tags 120 generated by the hierarchical classification system 104.

Figure 2:
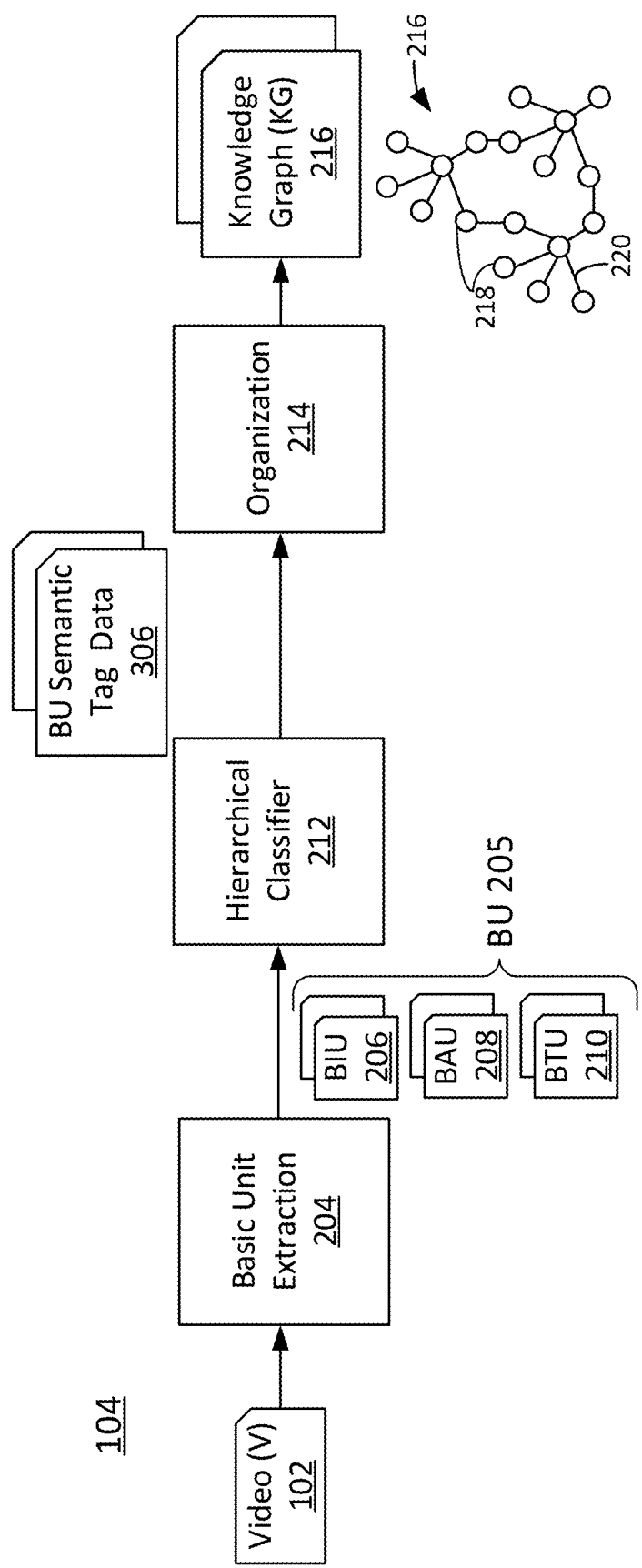
FIG. 2 shows a block diagram of a hierarchical classification system of the video analysis system of FIG. 1 for generating and organizing semantic tags for basic units of a video.

FIG. 2 shows a block diagram of a hierarchical classification system 104 of the video analysis system of FIG. 1 for generating semantic tags 120 in respect of a video 102 and aggregating that information into knowledge graphs 216. Hierarchical classification system 104 includes a basic unit extraction module 204, a hierarchical classifier 212, and an organization module 214. As used here, a "module" can refer to a combination of a hardware processing circuit and machine-readable instructions (software and/or firmware) executable on the hardware processing circuit. A hardware processing circuit can include any or some combination of a microprocessor, a core of a multi-core microprocessor, a microcontroller, a programmable integrated circuit, a programmable gate array, a digital signal processor, a general processing unit, an accelerator unit, or another hardware processing circuit. In some examples, module can refer to a purpose configured hardware processing circuit.

Basic unit extraction module 204 is configured to divide the input video 102 into Basic Units (BU) 205 for processing by classifier modules or nodes that are included in hierarchical classifier 212. In examples, a BU 205 can include image data (Basic Image Unit (BIU) 206), audio data (Basic Audio Unit (BAU) 208), and text data (Basic Text Unit (BTU) 210). In some examples, the duration of a video 102 that is included in a BU 205 may be determined based on the types of downstream classifier nodes that are included in hierarchical classifier 212. In some examples, basic unit extraction module 204 may be implemented using rule based algorithms, artificial intelligence (AI) models, and, or combinations thereof. By way of example, in a basic rules based implementation, a BU 205 could consist of the image data, audio data and text data associated with a defined number of image frames or video duration (e.g., a BU 205 could corresponds to a 1 minute portion of video 102, with a 10 minute video being divided into 10 successive BUs 205). In a more complex implementation, a BU 205 could consist of the image data, audio data and text data associated with a scene, with basic unit extraction module 204 including an AI model that has been trained to divide a video into BUs 205 of varying duration based on perceived scene transitions.

As used here, a "model" can refer to a combination of a hardware processing circuit and machine-readable instructions (software and/or firmware) executable on the hardware processing circuit that is configured to apply a processing function to input data to generate a corresponding output. An "AI model" can refer to a model for which the processing function has been learned or trained using machine learning (ML) techniques. A "classifier model" can refer to a model for which the processing function is configured to generate an output (e.g., a label) that classifies the input data.

Accordingly, the BIU 206 of a BU 205 will include image data for a set of successive image frames (e.g., one or more image frames) from the video 102, the BAU 208 will include audio data associated with the set of image frames, and the BTU 210 will include any text data associated with the set of image frames, for example, sub-title text provided with the video as metadata by a closed captioning system for hearing impaired or translation purposes). In some examples, the basic unit extraction module 204 can include one or more feature extraction modules that are configured to: transform raw image data corresponding to BUs 205 of video to representative image feature tensors of real number values for BIUs 206; transform raw audio data corresponding to BUs 205 of video to representative audio feature tensors of real number values for BAUs 208; and transform text data corresponding to BUs 205 of video to representative feature tensors of real number values for BTUs 210. In some examples, raw data may be preserved in the BIUs 206, BAUs 208 and BTUs 210 and transforming (also referred to as embedding) of the raw data into feature tensors may occur at later in nodes of the hierarchical classifier 212.

Figure 3:
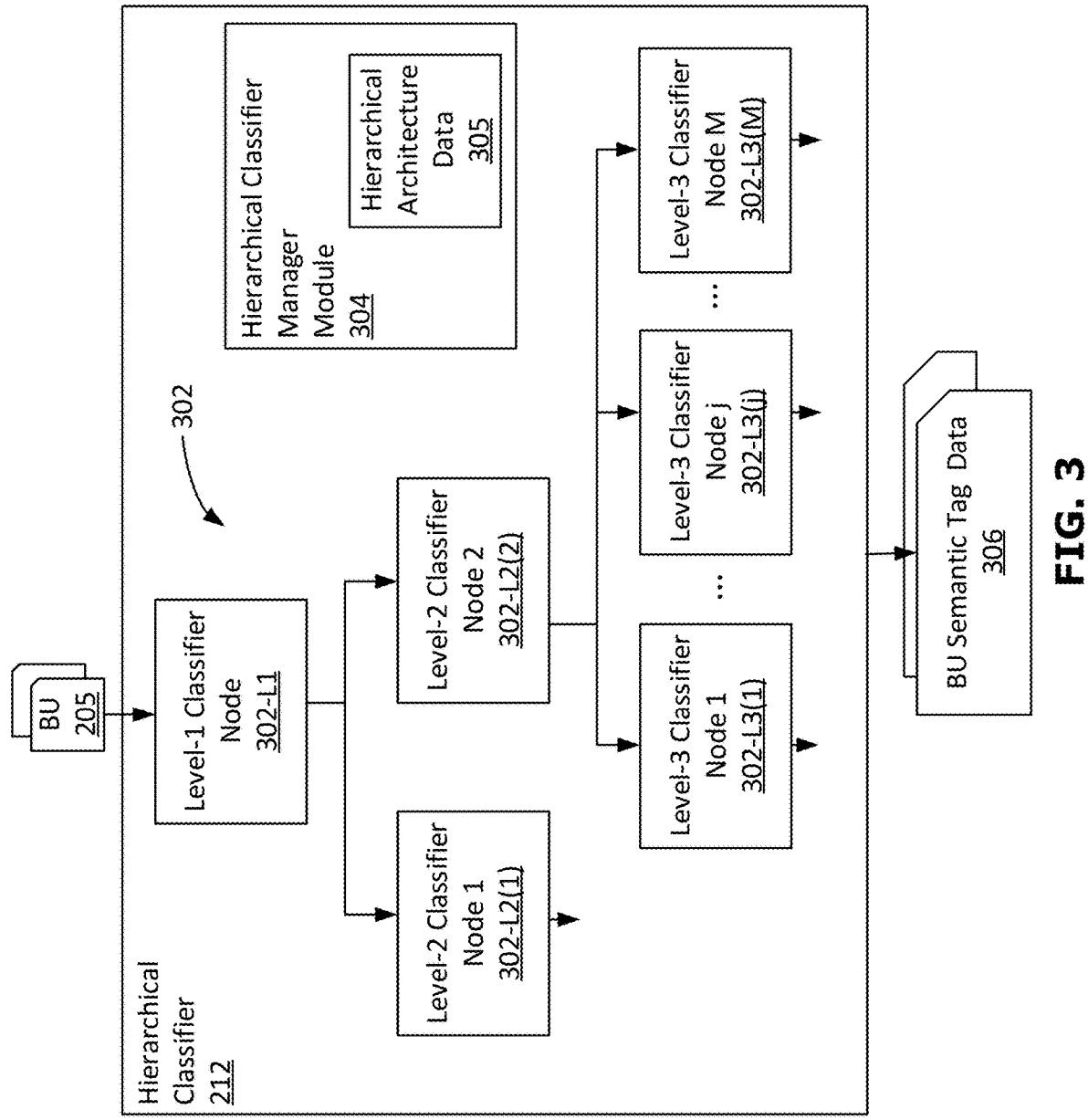
FIG. 3 is a block diagram representing a hierarchical classifier of the hierarchical classification system of FIG. 2.

The BU's 205 generated by basic unit extraction module 204 are then provided to hierarchical classifier 212 that is configured to generate sets of basic unit semantic tags (BU semantic tag data 306) for each BU 205. FIG. 3 is a block diagram representation of a hierarchical classifier 212 according to example embodiments. Hierarchical classifier 212, which can be distributed across multiple computer systems, comprises a hierarchy of classifier nodes 302, each of which comprises one or more rules based and/or AI based classifier models. Each of the classifier nodes 302 can have a specialized classifying function. Hierarchical classifier 212 can include multiple levels of binary class and multiple class classifier nodes 302, with each node in a level acting as a parent node for a respective set of classifier nodes in a lower level that are configured to generate further or more specific semantic tags for a BU 205. In the illustrated example, hierarchical classifier 202 includes a root classifier (level 1) node 302-1, which is a parent node for two level-2 classifier nodes 302-L2(1) and 302-L2(2). Each of the level-2 classifier nodes 302-L2(1) and 302-L2(2) can be parent nodes for a respective set of Level-3 classifier nodes. For example, in FIG. 3, level-2 classifier node 302-L2(2) is a parent node for M level-3 classifier nodes 302-L3(1) to 302-L3(M).

The configuration and operation of hierarchical classifier 212 is managed by a hierarchical classification manager module 304, which is configured to route each BU 205 through a selected classifier node 302 in each level based on the semantic tags generated for the BU 205 by higher level parent nodes. The hierarchical classification manager module 304 is configured to collect the semantic tags generated by any nodes 203 at each of the classifier levels for each BU 205, along with the identity of the classifier node 302 that generated the semantic tags, to output as BU semantic tag data 306.

In example embodiments, the hierarchical classification manager module 304 is preconfigured with hierarchical architecture data 305 that defines the hierarchical structure that is to be applied by hierarchical classifier 212. For example, the hierarchical architecture data 305 can include data that identifies a semantic tag taxonomy for the hierarchical classifier 212, the corresponding node architecture for each level of the hierarchical classifier 212, and routing logic for routing BUs through the hierarchical classifier 212.

A non-limiting illustrative example of a label taxonomy and routing information that may be included in hierarchical architecture data 305 is illustrated in the following Table 1: Hierarchical Semantic Tags/Labels.

TABLE 1

Table 1: Hierarchical Semantic Tags/Labels

| Level 1 Labels (Binary) Node ID: 302-L1 Node Type: Image Classifier | Level 2 Labels | Level 3 Labels | Level 4 Labels |
|---|---|---|---|
| Real-Life (YES) To: Node ID: 302-L2(1) (Type: . . . ) | News & Politics To: Node ID: 302-L3( . . . ) (Type: Type: . . . ) | International | Europe North America |
| | | National | ... USA Russia |
| | Travel To: Node ID: 302-L3( . . . ) (Type: . . . ) | Tropical | ... Caribbean Southern Asia |
| | Cooking/Baking To: Node ID: 302-L3( . . . ) (Type: . . . ) | Cake | ... Carrot Cake Wedding Cake |
| | | Burger | ... Cheeseburger Turkey burger |
| | Music To: Node ID: 302-L3( . . . ) (Type: . . . ) | Rock | ... Heavy Metal Indy |
| | | Classical | ... Orchestra |
| Real-Life (NO) To: Node ID: 302-L2(2) (Type: . . . ) | Computer Generated To: Node ID: 302-L3( . . . ) (Type: . . . ) Hand-Animated To: Node ID: 302-L3( . . . ) (Type: . . . ) | Game (YES) Game (NO) Cartoon | ... Fortnite Minecraft ... Looney Toons ... |

In the context of the tag taxonomy of Table 1, the level-1 classifier Node 302-L1 of Hierarchical Classifier 212 may for example be a binary AI classifier model that is specialized in distinguishing real-life videos from non-real life videos (e.g., animated videos). If a BU 205 is classified by classifier node 302-L1 as a "real-life"=YES video, it will be routed by the hierarchical classifier manager 304 to level-2 classifier node 302-L2(1) that includes an AI multi-class binary classifier model that is specialized to distinguish between the level-2 label classes listed in the second column of Table 1 adjacent the "real-life" parent class. Alternatively, if a BU 205 is classified by classifier node 302-L1 as a "real-life"=NO video, it will be routed by the hierarchical classifier manager 304 to level-2 classifier node 302-L2(2) that includes an AI multi-class classifier model that is specialized in distinguishing between computer generated and hand-drawn animations. If the level-2 classifier node 302-L2(2) classifies the BU 205 as a "computer generated" HM, hierarchical classifier manager 304 can route the BU 205 to a corresponding level-3 classifier node (e.g., level-3 classifier 302-L2(j)) that includes an AI classification model that is specialized in classifying between "game" videos and "not-game" videos. If the level-3 classifier 302-L2(j) labels BU 205 as a "game" video, hierarchical classifier manager module 304 can route the BU 205 to a corresponding level-4 classifier node that includes an AI classification model that is specialized in classifying specific "game" brands or genres (e.g., "Minecraft™" or "Fortnite™"). In at least some examples, the classifier nodes 302 are each configured to output a confidence value for the semantic tags that it generates, and these confidence values are also collected by the hierarchical classifier manager module 304. For example, the confidence level may be the maximum value of the probability distribution output by a softmax function of a classification model that is used to implement the classifier node 302. Accordingly, in the context of a BU 205 extracted from a gaming video uploaded by a Fortnite gamer, the BU semantic tag data 306 that is compiled by hierarchical classification manager 304 for the BU 205 may include the following information: Level 1 Tag="Animated", Confidence: 94%, (Node ID: 302-L1); Level 2 Tag="Computer Generated" Confidence: 97%, (Node ID: 302-L2(2)); Level 3 Tag="Game" Confidence: 99%, (Node ID: 302-L3($j$)); Level 4 Tag="Fortnite", Confidence: 93%, (Node ID: 302-L4($i$)). The BU semantic tag data 306 may also include one or more time stamps or other temporal information to indicate a temporal location of the semantic tag within the BU 305. In some examples where objects within a spatial area of a video frame are tagged, the BU semantic tag data 306 may also include spatial data associated with semantic tags.

The hierarchy shown above and described in respect of FIG. 3 and Table 1 is purely illustrative. The hierarchal selection and organization of the classifier nodes (e.g., the taxonomy of the hierarchical classifier 212 that is defined by hierarchical architecture data 305) can take many different forms and can be predetermined to provide optimized results in view of the type of environment that the video analysis system 100 operates within. For example, factors such as the type, size and number of videos that are anticipated to be processed by the video analysis system 100, the computational resources available to the video analysis system 100, the classification models that are available, and the specificity requirements on the labels generated by the video analysis system 100 are all factors that may determine the classifier taxonomy used for hierarchical classifier 212. As will be described in greater detail below, in various embodiments, the taxonomy of the hierarchical classifier 212 can be manually configured, generated using AI, and combinations thereof. In example embodiments, the taxonomy of the hierarchical classifier 212 is configured to direct classification tasks to the classification models that are most suited for the task, and to bypass classification models that are not especially effective for a task.

In example embodiments, the different classifier nodes 302 may be hosted on a common computer system with one or other modules of the video labeling system 100. Alternatively, in some examples, different physical computer systems or different virtual machines may be used to host one or more respective classifier nodes 302, with BU 205 routing to the specialized classifier nodes 302 and collection of labels generated by the classifier nodes 302 occurring over a communications network and being controlled by hierarchical classifier manager module 304. Such a configuration can allow specialized classifier nodes 302 to be hosted on respective computer systems that are optimized for such classifier nodes 302, and allow classifier nodes 302 to be shared resources used by different levels or branches within the hierarchical classifier 212 or in multiple different video analysis systems 100.

Illustrative examples of different classifier node 302 configurations will now be described in greater detail. A first type of classifier node configuration 302 may for example be a single modality classifier, namely a classifier node that is configured to process only one of the data types includes in a BU 205, for example, the image data included in the BIU 206, audio data included in the BAU 208 or text data included in the BTU 210. By way of example, a classifier node 302 for classifying image data could include a specialized direct image classifier that is implemented using one of the following known AI models: ResNet, which is a deep CNN; RegNet; and EfficientNet, among others. A classifier node 302 that labels detected object in image data could be based on the YOLOv5 model. A classifier node 302 for classifying audio data could include a specialized audio classifier that is implemented using known AI-based models such as VGGish or Argus FreeSound. A classifier node 302 for classifying text data could include a natural language processor (NLP) classifier model such as Word2Vec, FastText or BERT, among others. The above examples of AI classification models are illustrative only. Many different types and configurations of trained AI classification models can be incorporated into the classifier nodes 302 of hierarchical classifier 212, including models that are based on artificial neural network structures, including but not limited to models that are based on or more of CNN, RNN, LSTM and/or Transformer architectures. Other possible types of AI classification modules that can be incorporated into the classifier nodes 302 include models that are based on decision tree algorithms, support vector machine algorithms, and logistic regression algorithms.

In some examples, hierarchical classifier 212 can include multiple parallel hierarchical classifier paths, each configured to generate semantic tags based on a single type or modality of data. For example the hierarchical set of classification nodes 302 could include a first hierarchical group of classification nodes 302 for processing image data (e.g., BIUs 206), a second hierarchical group of classification nodes 302 for processing audio data (e.g., BAUs 208), and a third hierarchical group of classification nodes 302 for processing text data (e.g., BTUs 210). The resulting BU semantic tag data 306 can include hierarchical semantic tags generated in respect of each of the types of data modalities included in BU 205.

Figure 4:
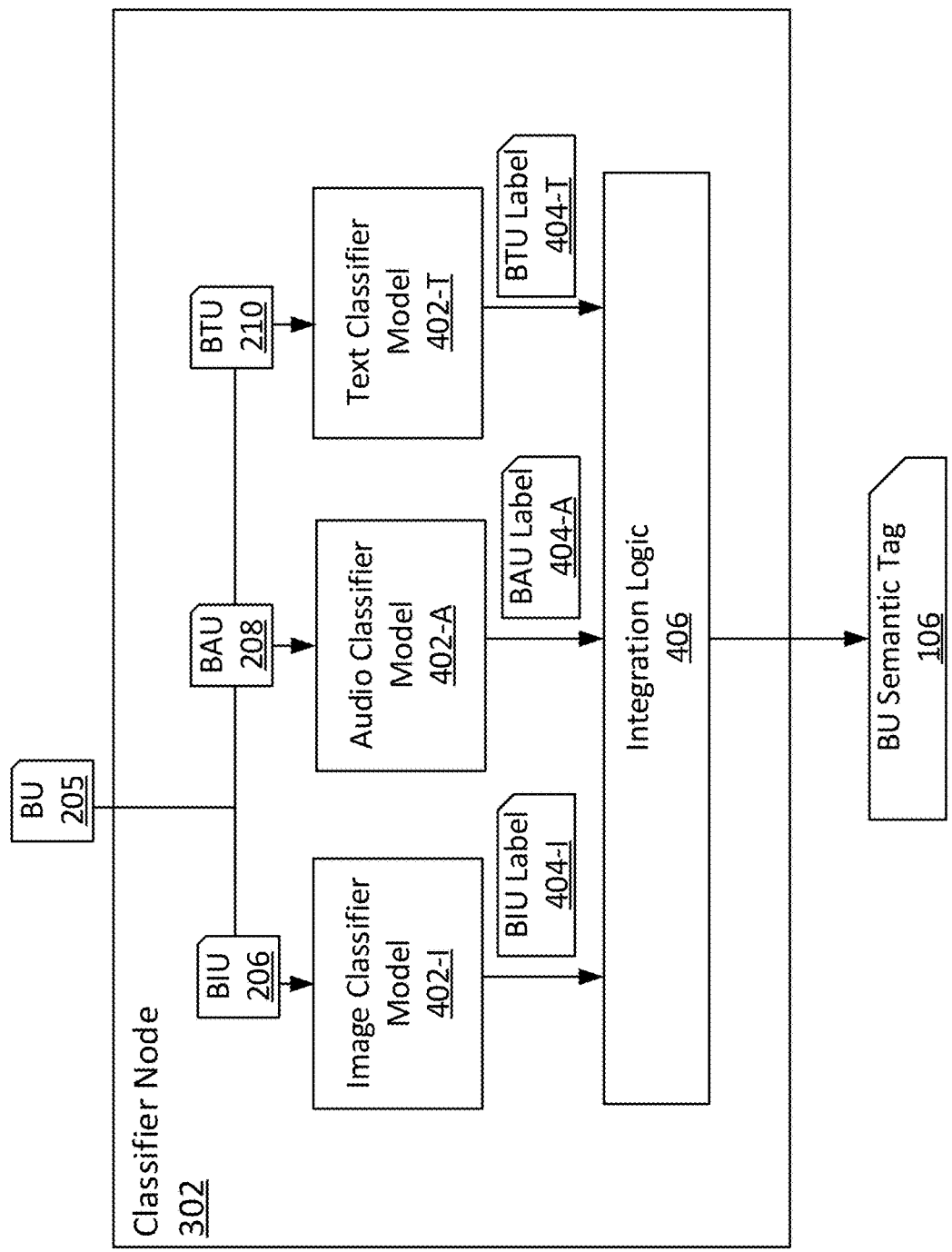
FIG. 4 is a block diagram of an example of a multi-classifier model classification node that can be included in the hierarchical classifier.

In some examples, a classifier node 302 may include multiple classification models, including multiple classifier models for a single type of data modality and/or classifier models for each type of data modality included in the video. In this regard, FIG. 4 illustrates an example of a classifier node 302 that includes multiple classifier models, namely an image classifier model 402-I for processing BIUs 206, an audio classifier model 402-A for processing BAUs 208 and a text classifier model 402-T for processing BTUs 210. In some examples, these models may for example each be implemented using the respective text, audio and text AI classifier models noted above. Each of the classifier models 402-I, 402-A and 402-T outputs respective semantic labels. For example, classifier model 402-I can generate a semantic label 404-I for an input BIU 206; classifier model 402-A can generate a semantic label 404-A for an input BAU 208; and classifier model 402-T can generate a semantic label 404-T for an input BTU 210. In example embodiments, each of the classifier models 402-I, 402-A and 402-T also outputs a confidence value associated with the semantic label it generates. As indicated in FIG. 4, the classifier node 302 can includes integration logic 406 that is configured to generate a BU semantic tag 106 as the classifier node 302 output based on the generated BIU, BAU and BTU labels 104-I, 404-A and 402_T. Integration logic 406 may include predefined rules for determining a BU semantic tag 106 based on the outputs generated by the multiple classifier models. In one example, integration logic 406 may be configured to select the BIU, BAU or BTU label that has the highest associated confidence value to use as the BU semantic tag 106 for the BU 205. In some examples, integration logic 406 may be configured to apply a voting system whereby the semantic label that is generated by the majority of the classifier models included in classifier node 302 is selected as the BU semantic tag 106. In some voting examples, the voting can be weighted according to confidence values and/or a preference or bias for one or more of the classification models. In some examples, the integration logic may consider the softmax probability distribution outputs for all possible labels across all of the classifier models in the classifier node 302; the confidence values for all possible labels can be averaged across the multiple classifier models, and the label having the highest average softmax probability value across all of the classifier models can be selected for use as the BU semantic tag 106.

Accordingly, in some examples, wherein each of the multiple artificial neural network classifier models 402 is configured to generate, for an input BU 205, a probability distribution for a set of candidate semantic labels. A confidence value for each of the candidate semantic labels can correspond to the probability values assigned to each candidate semantic label. The integration logic 406 can determine the BU semantic tag 106 for the input BU 205 based on one or more of: (i) the candidate semantic label generated by all of the multiple artificial neural network classifier models 402 having the highest overall associated confidence value; (ii) the candidate semantic label generated by all of the multiple artificial neural network classifier models 402 having the highest average associated confidence value; and (iii) the candidate semantic label generated by all of the multiple artificial neural network classifier models 402 having the highest overall associated confidence value at a majority of the multiple artificial neural network classifier models.

In example embodiments, the confidence values, predicted labels, and classifier model IDs, and an integration logic ID can be tracked as metadata that is associated with the BU semantic tag 106 and provided to the hierarchical classifier manager module 304. This metadata can then be used to evaluate the performance of hierarchical classifier 212 and allow adjustment of the Hierarchical Architecture Data 305 that defines the architecture of hierarchical classifier 212 to improve future performance.

As noted above, in some examples a classifier node 302 can include just a single classifier model, in which case integration logic may be omitted and the BU semantic tag 106 output by the classifier node 302 can be the semantic tag generated by the classifier model.

Figure 5:
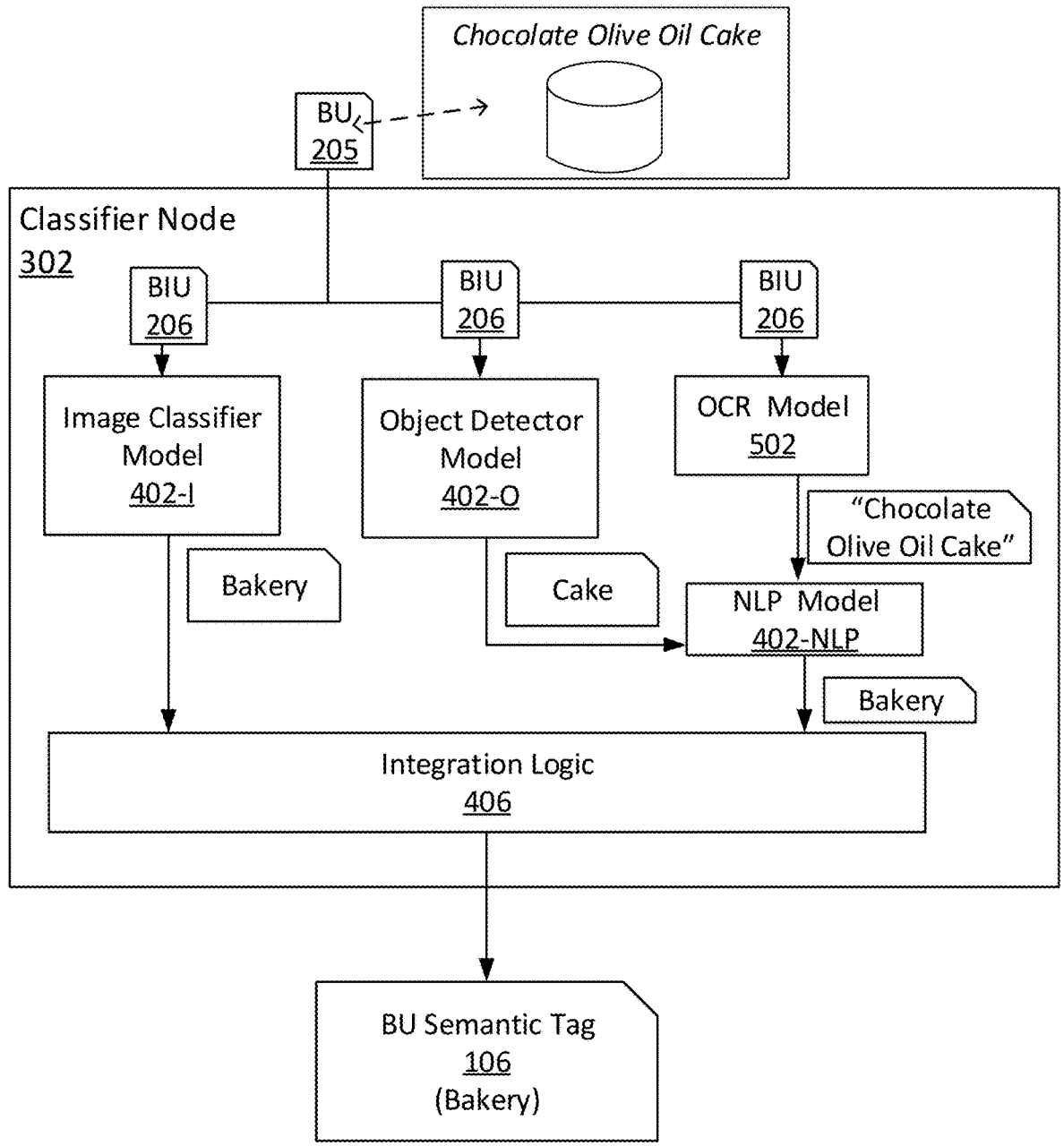
FIG. 5 is a block diagram of a further example of a multi-classifier model classification node that can be included in the hierarchical classifier.

A further example of a possible classifier node 302 configuration is illustrated in FIG. 5. In the example of FIG. 5, only the image data (BIU 206) corresponding to a BU 205 is processed by the classifier node 302, but the classifier node 302 includes multiple image data processing models, including an image classifier model 402-I, an object detector model 402-0, and a text processing Natural Language Processing (NLP) classifier model 402-NLP that is paired with an Optical Character Recognition (OCR) Model 502. In the example of FIG. 5, the BIU 206 includes a series of image frames, including a subset of frames that depict an image of a cake below a title sentence "Chocolate Olive Oil Cake" that is embedded in the image data. Image classifier model 402-I generates the semantic label "Bakery" based on the image data included in the BIU 206. Object detector model 402-0 detects a cake in the image data included in the BIU 206, and thus generates the label "cake". OCR model 502 is configured to detect images that correspond to text that is part of the image data, and accordingly extracts the text "Chocolate Olive Oil Cake" from BIU 206. In the illustrated example both the label "cake" output by the object detector model 402-0 and the extracted text "Chocolate Olive Oil Cake" are embedded as vectors and passed to NLP model 402-NLP, which generates a corresponding semantic label "Bakery". Based on the label "Bakery" generated by both image classifier model 402-I and NLP model 402-NLP the Integration Logic 406 outputs "Bakery" as the semantic tag 106 for BU 205. Accordingly, in addition to processing image data using image classifier model 202-I, the classifier node 302 of FIG. 5 incorporates models (e.g., object detection model 402-0 and OCR model 502) that each extract text information from the image data that is then processed by NLP model 402-NLP.

Figure 6:
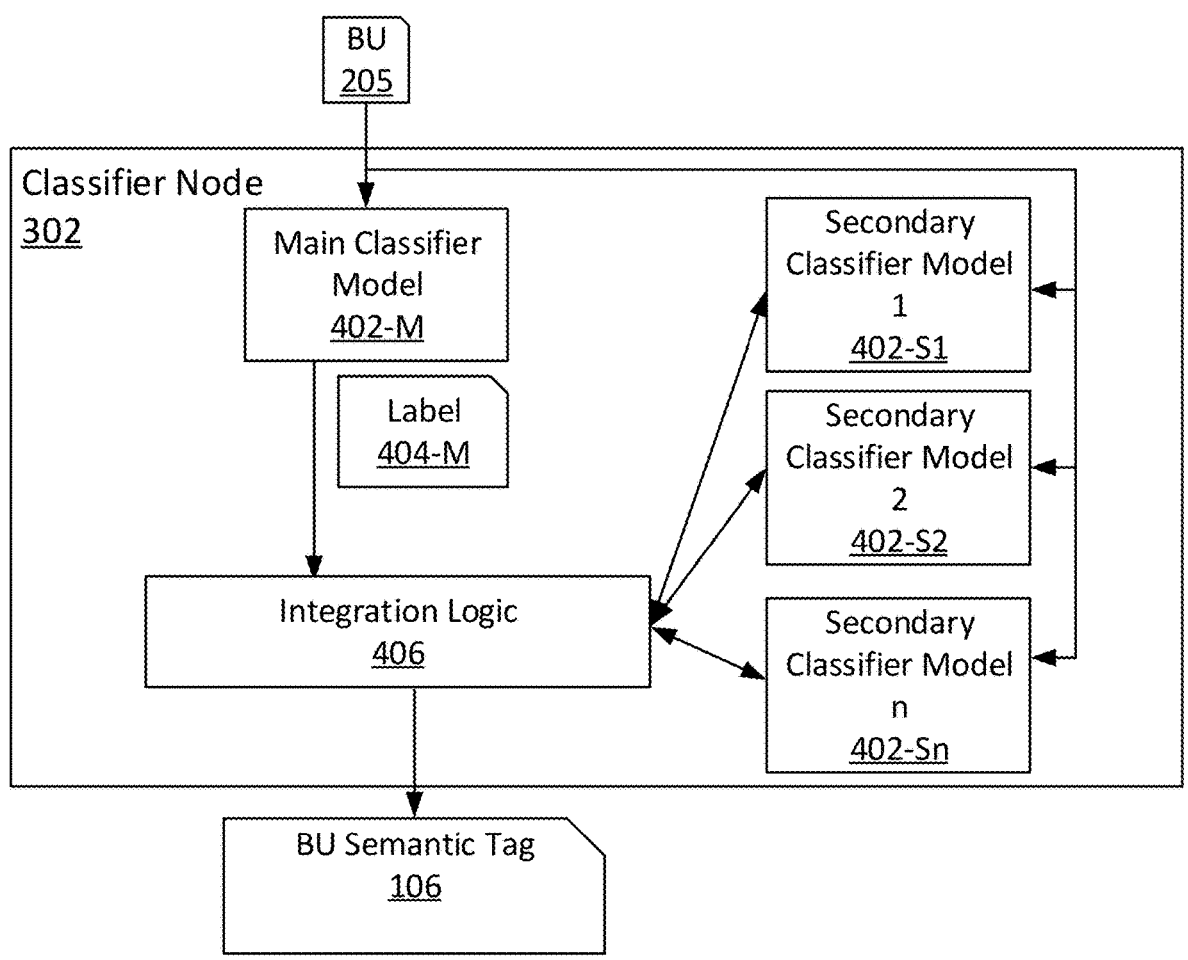
FIG. 6 is a block diagram of a further example of a multi-classifier model classification node that can be included in the hierarchical classifier.

A further example of a possible classifier node 302 configuration is illustrated in FIG. 6. The classifier node of FIG. 6 includes a main classifier model 402-M and one or more secondary classifier models 402-S1 to 402-Sn. The classifier models 402-M and 402-S1 to 402-Sn can each be different AI models, at least some of which may operate on different types of data modalities. In examples, the classifier node 302 of FIG. 6 is an "on-demand" configuration, meaning that the label 404-M generated by the main classifier model 402-M in respect of an input BU 205 will be output as the BU semantic tag 106 unless integration logic 406 determines that the label 404-M does not meet defined criteria, for example a defined confidence level. If integration logic 406 determines that the label 404-M generated by the main classifier model 402-M does not meet the defined criteria, it will call on one or more of the secondary classifier models 402-S1 to 402-Sn to also process the BU 205 and generate respective labels. Integration logic 406 can then determine BU semantic tag 106 based on the labels generated by the main classifier model 402-M and one or more of the multiple the secondary classifier models 402-S1 to 402-Sn using one or more of the label selection techniques described above (e.g., highest confidence, majority voting, weighted majority voting, highest average confidence).

By way of example, in an illustrative scenario, the BU 205 input to classifier node 302 of FIG. 6 may be the same "Chocolate Olive Oil Cake" video clip described in respect of FIG. 5. Main classifier model 402-M may be an image classifier model that generates, with a 60% confidence value, the label 404-M "bakery" based in the image data included in the BIU 406 of BU 205. Integration logic 406 determines that 60% confidence value associated with label 404-M "bakery" falls below a predetermined confidence level threshold (e.g., 85%), and accordingly requests secondary classifier model 1 402-S1 to process the BIU 406 of BU 205. In the illustrative embodiment, secondary classifier model 1 402-S1 comprises the Image to Text classifier model 402-IT of FIG. 5 (e.g., paired OCR and NLP models), which generates the label "bakery" with confidence value 84%. Integration logic 406 applies majority voting and outputs "Bakery" as the BU semantic tag 106.

It will thus be appreciated that hierarchical classifier 212 that includes a hierarchical classifier manager module 304 that calls on a distributed set of classifier nodes 302 based on predefined hierarchical architecture data 305 enables a classifier solution that allows subsets of video data (e.g., BUs 205) within a video 110 to each be routed through a different path of classifier models that are specialized in processing the type of content included in each of the video data subsets. This can allow an optimized use of multiple classifier models whereby the most relevant classifier models are employed for a particular classification task and less relevant models are by-passed. The distributed nature can allow each classifier model to be hosted in the optimized environment for that model, and trained for a highly specialized task.

Referring again to FIG. 2, hierarchical classifier 212 generates BU semantic tag data 306 for each BU 205 that it processes in respect of video 102. For each BU, semantic tag data 306 will include at the semantic tags or tags generated by the final classifier node 302 of the hierarchical classifier 212. In some examples, semantic tag data 306 will also include the semantic tags or tags generated at the root and any intermediate classifier nodes 302 of the hierarchical classifier 212, and possibly the labels generated by individual models in classifier nodes 302 that include multiple classifier models. In at least some examples, each of the semantic tags and labels can have associated metadata that indicates one or more of a confidence value, a time stamp, spatial information, and an ID of the generating classifier node and/or classifier model. In this regard, in example embodiments the hierarchical classification manager module 304 collects metadata from each of the classifier nodes and modules to the extent that such information is available and associates that information with the generated semantic tags and labels for inclusion in BU semantic tag data 306.

In example embodiments, hierarchical classification system 104 includes an organization module 214 for organizing the information included in the BU semantic tag data 306 that is generated for successive BUs 205. In one example, organization module 214 organizes BU semantic tag data 306 for each BU 205 into a knowledge graph 216. Knowledge graph 216 includes graph nodes 218 that are connected by links 220 (also referred to as edges, which indicate relationships between graph nodes 218). Each node 218 can include information for a respective semantic tag and the metadata associated with the tag (e.g., timestamp, generating node ID, generating model ID, and confidence value). In example embodiments, organization module 214 is configured to organize the semantic tags included in BU semantic tag data 306 into a graphical format that provides information about the following: (i) Subject(s)—a subject is an object that is responsible for performing an action on another object; a subject object can be represented as a node 218 with a set of node attributes; (ii) Target(s)—a target is an object that is acted on by a subject; a target object can be represented as a node 218 with a set of node attributes; (iii) Predicate(s): a predicate is the action that is being performed by a subject object on a target object, or a preposition indicating a position (such as "on", "below" etc.,) of the subject relative to the target; a predicate can be represented as a node 218 that is connected by links 220 to subject nodes and target nodes. Nodes 218 can each have an associated timestamp to provide temporal data. In some examples, organization module 214 may be implemented using a trained AI model that is configured to organize BU semantic tag data 306 into a knowledge graph 216 comprising nodes 218 and links 220 (also referred to as edges).

Accordingly, in example embodiments, the hierarchical classification system 104 generates a plurality of knowledge graphs 216, each of which represents a set of semantic tags 116 and associated metadata that have been generated in respect of a portion (e.g., BU 205) of an input video 102. Each knowledge graph 216 includes a respective set of temporal-organized semantic facts about a BU 205. In some examples, a single knowledge graph 216 may include facts from multiple BUs 205.

As will be described in greater detail below, in example embodiments the hierarchical classifier management module 304 can be custom configured by hierarchical architecture data 305 to enable developers to arrange individual classifier nodes (and the classifier models that make up such nodes) to provide heterogeneous AI sub-ecosystems in an hierarchical structure where basic units of a video can be routed through unique paths to extract knowledge graphs 216.

Figure 7:
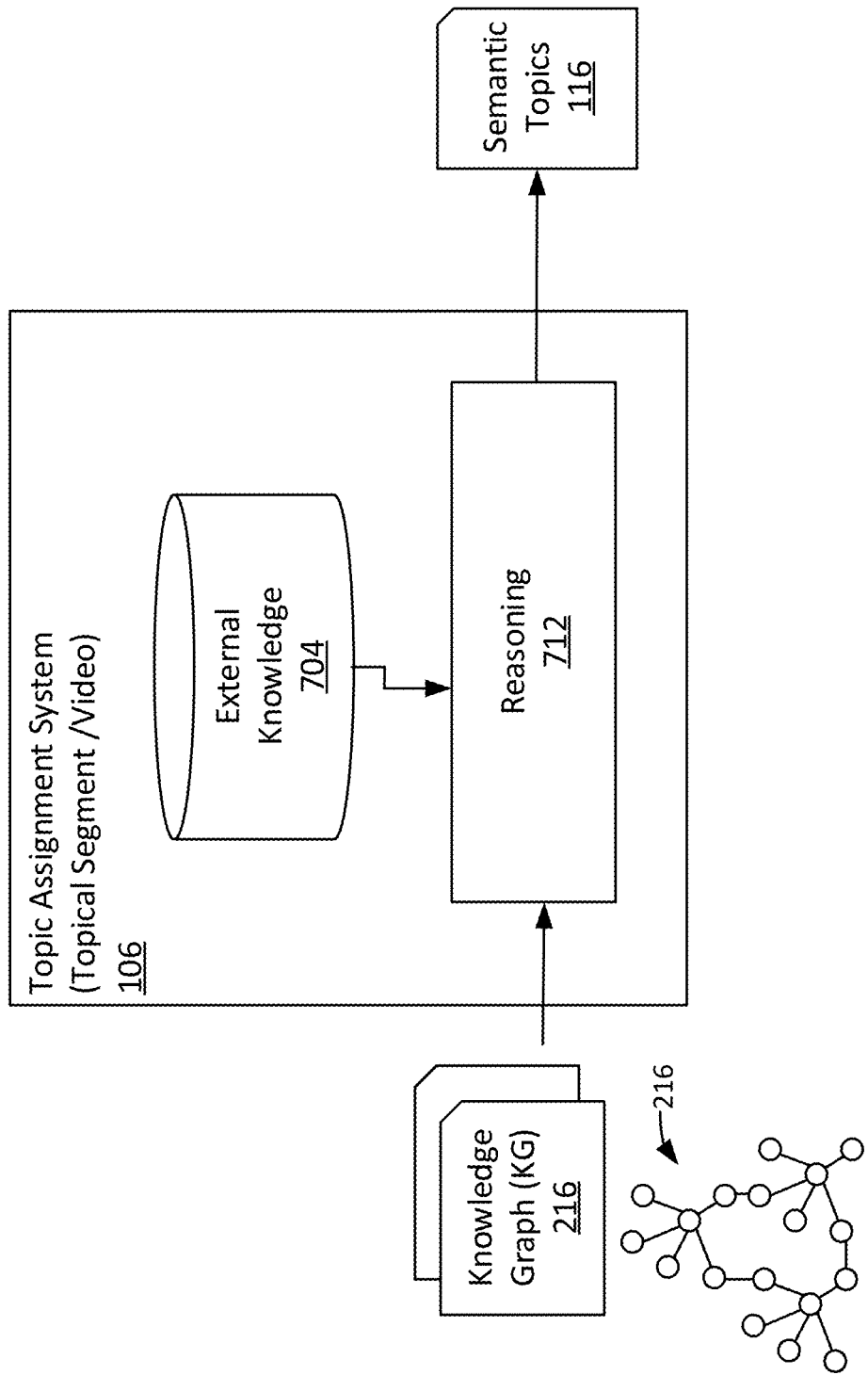
FIG. 7 shows a block diagram of a topic assignment system of the video analysis system of FIG. 1 that aggregates semantic tag data and generates semantic topics for a video and topical segments of the video.

Referring again to FIG. 1, the knowledge graphs 216 generated by hierarchical classification system 104 are processed by topic assignment system 106 to generate semantic topics 116 for video 102 and, in some examples, topical segments of video 102. FIG. 7 shows a block diagram of a topic assignment system 106 that processes the knowledge graphs 216 generated by the hierarchical classification system of FIG. 2 to generate semantic topics 116. Topic assignment system 106 includes a reasoning module 712 that may be implemented using aggregation and topic generation techniques that are selected by a system developer based on characteristics of the task that the video analysis system 100 will be applied to.

For example, aggregating and topic generation could be based on one or more of: (i) Majority Voting based on frequency and of appearance of semantic tags and other information throughout the knowledge graphs 216; (ii) Metadata Based Aggregation, based on a heuristics driven metadata analysis of the knowledge graphs 216; (iii) Temporal Information Aggregation based on operation on temporal slices, as represented by the knowledge graphs 216; in a sequential fashion to leverage temporal nature of sequence; (iv) Rule-Based Semantic Tag Aggregation, based on "external knowledge" based rules that are used to apply a deterministic process.

The heuristics, temporal cut-offs, thresholds, and rules applied in the above methodologies may, in example embodiments, be derived from an external knowledge database 704 that is based on one or both of manually acquired data or data that has been learned through AI models. For example, external knowledge database 704 may include data such as knowledge graph queries that have been learned by a Natural Language Understanding (NLU) model which has been trained on large corpus. For example, an advanced NLU model may determine that a baking video involves a knowledge graph that represents the presence of a baker who progressively prepares dough/egg based eateries by baking the items in an oven. This knowledge can be stored as knowledge graph query in external knowledge database 704 and used to indicate to the reasoning module 212 that a defined fact pattern, e.g., egg, oven, baker, dough, batter, etc. match with data included in knowledge graphs 216 can be associated with a semantic topic "e.g., baking a chocolate cake"). In some examples, external knowledge database 704 may include a plurality of knowledge graph queries that each have associated semantic topics, and reasoning module 712 is configured to determine the closest match between the knowledge graphs 216 and the knowledge graph patterns included in external knowledge database 704 to determine video level and video segment level semantic topics 116. These pre-captioned knowledge graph patterns can include patterns that are the results of analysis performed by data scientists and/or patterns generated using AI models. An example of knowledge graph based methodologies that can be applied in example embodiments are described in: Paul Vicol et al, "MovieGraphs: Towards Understanding Human-Centric Situations from Videos" arViv:1712.06761v2 [cs:CV] 15 Apr. 2018, the contents of which are incorporated herein by reference.

Thus, data (including semantic tags) generated by the hierarchical classifier 212 is organized by organization module 214 into knowledge graphs 216 intrinsically through the presence of a field for each type of metadata. For example: Field: OCR Detected, Value: "Chocolate Olive Cake", or Field: Objects Detected, Value: List('baker', 'oven', 'cake') etc. In the knowledge graph 216, the data can be organized to enable it to be queried by reasoning module 712 to derive smaller subgraphs. For example, the knowledge graph 216 can be queried to output subgraphs centering around nodes that represent the baker, the oven and the cake separately. Query graphs and search logic stored as external knowledge 705 can be applied by the reasoning module 712 to query the knowledge graph to get the necessary subgraphs, allowing knowledge implied by the knowledge graph (or subgraphs) to be mapped to semantic topics 116.

The external knowledge 704 is constructed, by human involvement and/or NLU methods to enable the reasoning module 712 to look for query matches (through knowledge graph querying, e.g., by having a lookup for each semantic topic, the query involved). The reasoning module 712 takes as input the knowledge graph 216 and the external knowledge query graphs executes the queries (which represent a set of rules) on the knowledge graph 216 to see if any query produces a successful hit (rule match successful). Whichever rules match, the associated semantic topics will be associated with the input video.

In example embodiments, the semantic topics 116 and BU semantic tag data 306 are included in the semantic data 108 generated by the video analysis system 100. This can enable the cumulated data collected by the modules of the hierarchical classification system, 104 and topic assignment system 106 to be available for review at a level of granularity that enables decision making process of the video analysis system 100 to be reviewed and dissected by system developers, thereby facilitating further refinement of the models and external knowledge used by the system 100. This can be contrasted with traditional deep learning model wherein labelling decisions is typically unexplained due to the black box nature of deep learning based systems.

Figure 8:
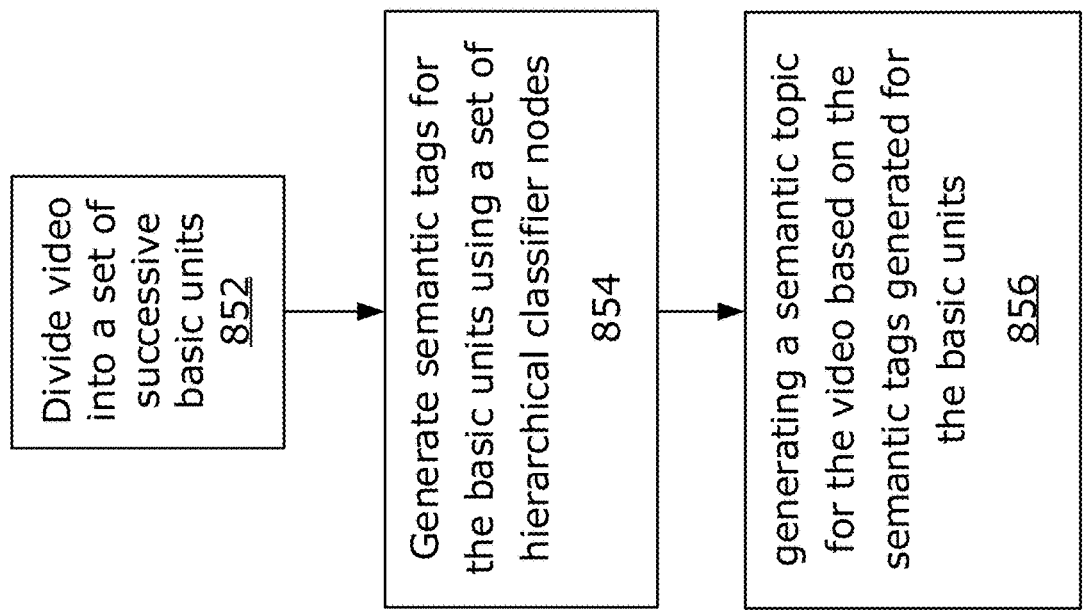
FIG. 8 is a flow diagram that provides an overview of the operation of the video analysis system of FIG. 1 according to example embodiments.

A flow diagram that provides an overview of the operation of the video analysis system 100 is illustrated in FIG. 8. FIG. 8 illustrates a computer implemented method of analyzing a video 102 using video analysis system 100. As indicated in block 852, the video 102 is divided into a set of successive BUs 205. As indicated at block 854, semantic tags 120 are generated for the BUs 205 using a set of hierarchical classifier nodes 302 that comprise a parent classifier node (e.g. node 302-L1) and a plurality of child classifier nodes (e.g., nodes 302-L2(1) and 302-L2(2)) configured to determine semantic tags for the BUs 205, wherein the BUs 205 are each routed through selected child classifier nodes based on classification of the basic units 205 by the parent classifier node. As indicated at block 856, a semantic topic 116 is generated for the video 102 based on the semantic tags 120 generated for the basic units 205.

In some examples, the child classifier nodes include a first child classifier node (e.g., node 302-L2(1)) configured to determine semantic tags 120 for BUs 205 based on audio data (BAUs 208) included in the BUs 205, and a second child classifier node (e.g., node 302-L2(1)) configured to determine semantic tags 120 for BUs 205 based on image data (BIUs 206) included in the BUs 205, and each BU 205 is selectively routed for semantic tagging to either the first child classifier node or to the second child classifier node based on the classification of the basic unit by the parent classifier node (e.g., node 302-L1).

In some examples, the set of hierarchical classifier nodes 302 comprise classifier nodes 302 that each include a different artificial neural network classifier model 402 trained to assign semantic tags selected from a respective set of semantic tags.

In some examples, the set of hierarchical classifier nodes 302 are distributed among multiple computer devices.

In some examples, the set of hierarchical classifier nodes 302 includes a classifier node 302 that comprises: multiple artificial neural network classifier models 402 that are each configured to generate a semantic label 404 for an input BU 205, and integration logic 406 for determining the semantic tag 106 for the input BU 205 based on semantic labels 404 generated by one or more of the multiple artificial neural network classifier models 402 (see FIGS. 4, 5 and 6 for example).

In some examples, the multiple artificial neural network classifier models include a first classifier model (e.g., model 402-A) configured to determine a semantic label 404A for the input BU 205 based on audio data (BAU 208) included in the input BU 205, and a second classifier model (e.g. model 404-I) configured to determine a semantic label 404-I for the input BU 205 based on image data (BIU 206) included in the input BU 205.

In some examples, each of the multiple artificial neural network classifier models 402 is configured to generate, for the input BU 205, a softmax output that includes plurality of possible candidate semantic labels each having an associated confidence value, wherein the integration logic 406 determines the semantic tag 106 for the input BU 205 based on one or more of: (i) the candidate semantic label generated by all of the multiple artificial neural network classifier models having the highest overall associated confidence value; (ii) the candidate semantic label generated by all of the multiple artificial neural network classifier models having the highest average associated confidence value; (iii) the candidate semantic label generated by all of the multiple artificial neural network classifier models having the highest overall associated confidence value at a majority of the multiple artificial neural network classifier models.

Figure 9:
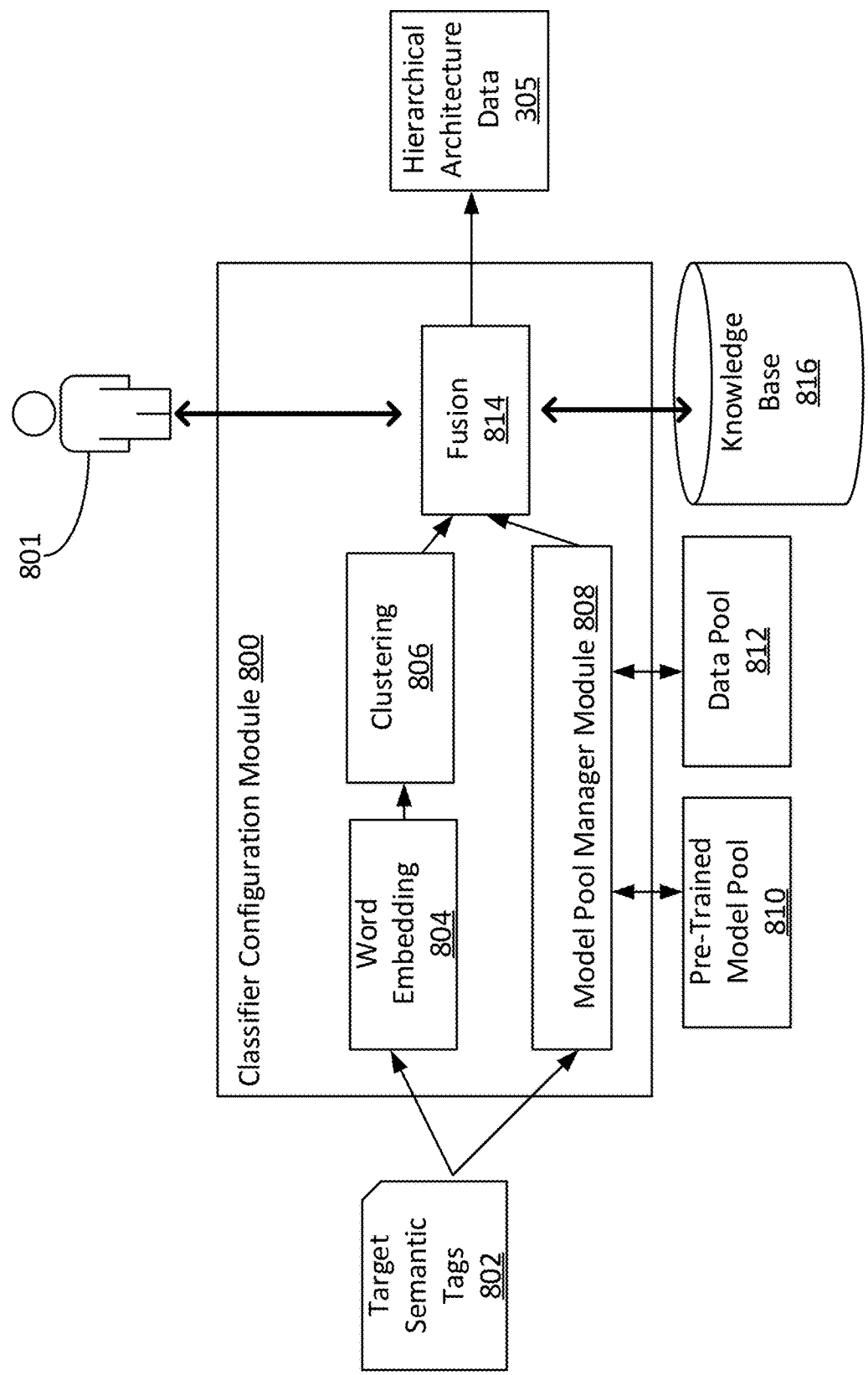
FIG. 9 shows a block diagram of a classifier configuration module that can be used to generate hierarchical architecture data for the hierarchical classifier of FIG. 3.

Referring again to FIG. 3, as noted above, in example embodiments, hierarchical classification manager module 304 is preconfigured with hierarchical architecture data 305 that defines the hierarchical structure that is to be applied by hierarchical classifier 212. Among other things, the hierarchical architecture data 305 can include data that identifies a semantic tag taxonomy for the hierarchical classifier 212, the corresponding node architecture for each level of the hierarchical classifier 212, and routing logic for routing BUs through the hierarchical classifier 212. In some examples, hierarchical architecture data 305 may be determined by a system developer/data scientist using a combination of simulations based on a pool of pre-trained AI classifier models and analysis to determine an appropriate hierarchical classifier architecture, In some examples, automated tools may be used to assist with the selection and arrangement of the models that are defined by hierarchical architecture data 305. In this regard, FIG. 9 illustrates a block diagram of a classifier configuration module 800 that may, in some example embodiments, assist a human operator 801 with configuring the hierarchical architecture data 305.

In example embodiments, the input to classifier configuration module 800 is an unstructured set of target semantic tags 802. For example, the set of target semantic tags 802 could include labels such as those included in Table 1, without any hierarchical ordering. In some examples, the set of target semantic tags 802 could be derived from the classification labels that can be generated by a known pool 810 of pre-trained AI classification models. In example embodiments, pre-trained AI classification model pool 810 is a pool of AI classification models 402 that are available for implementing classifier nodes 302 of distributed hierarchical classifier 212.

In example embodiments, the semantic tags included in the target set 802 of semantic tags are organized by classifier configuration module 800 using two parallel processing paths. In a first processing path, known word embedding techniques are applied by a word embedding module 804 to transform the text word semantic tags into numeric feature vectors. The feature vectors can then be clustered by a clustering module 806 into similar groups based on mathematic distances between the feature vectors, using known similarity based clustering techniques (for example). The resulting clusters of similar semantic tags can then be considered as candidate sets of semantic tags that can grouped as a possible classifier node 302 output. In example embodiments, the identified clusters of similar semantic tags are provided to a fusion module 814.

In a second processing path, the semantic labels included in the target set 802 of semantic tags are organized into groups by a model pool manager module 808 based on the performance of classifier models 402 included in the pre-trained classifier model pool 810, which can include various types of image classifier models, audio classifier models, image based object detection and classification models, and text classifier models, for example. Different models can different performance on different label sets. For example, an image classifier may be very effective at differentiating between real-life and non-real life (e.g., animated) videos, but easily confuse gaming videos from cartoon videos. In this regard, model pool manager module 808 can be configured to use the models included in pre-trained model pool 810 to classify videos included in training data sets (data pool 812) that are labelled with the tags from target semantic tag set 802. For example, data pool 812 may include training image sets such as ImageNet™, OpenImages™, and Kinetics™, among others. The model pool manager module 808 can then provide data about the performance of the available pre-trained classifier models 402 in respect of the target semantic tags 802 to fusion module 814. In example embodiments, model pool manager module 808 can generate a confusion matrix for each respective classifier model 402 that can be used to determine what classification categories (e.g. which semantic tags) should not be determined by a common classifier model but rather should be routed to different classifier models.

Figure 10:
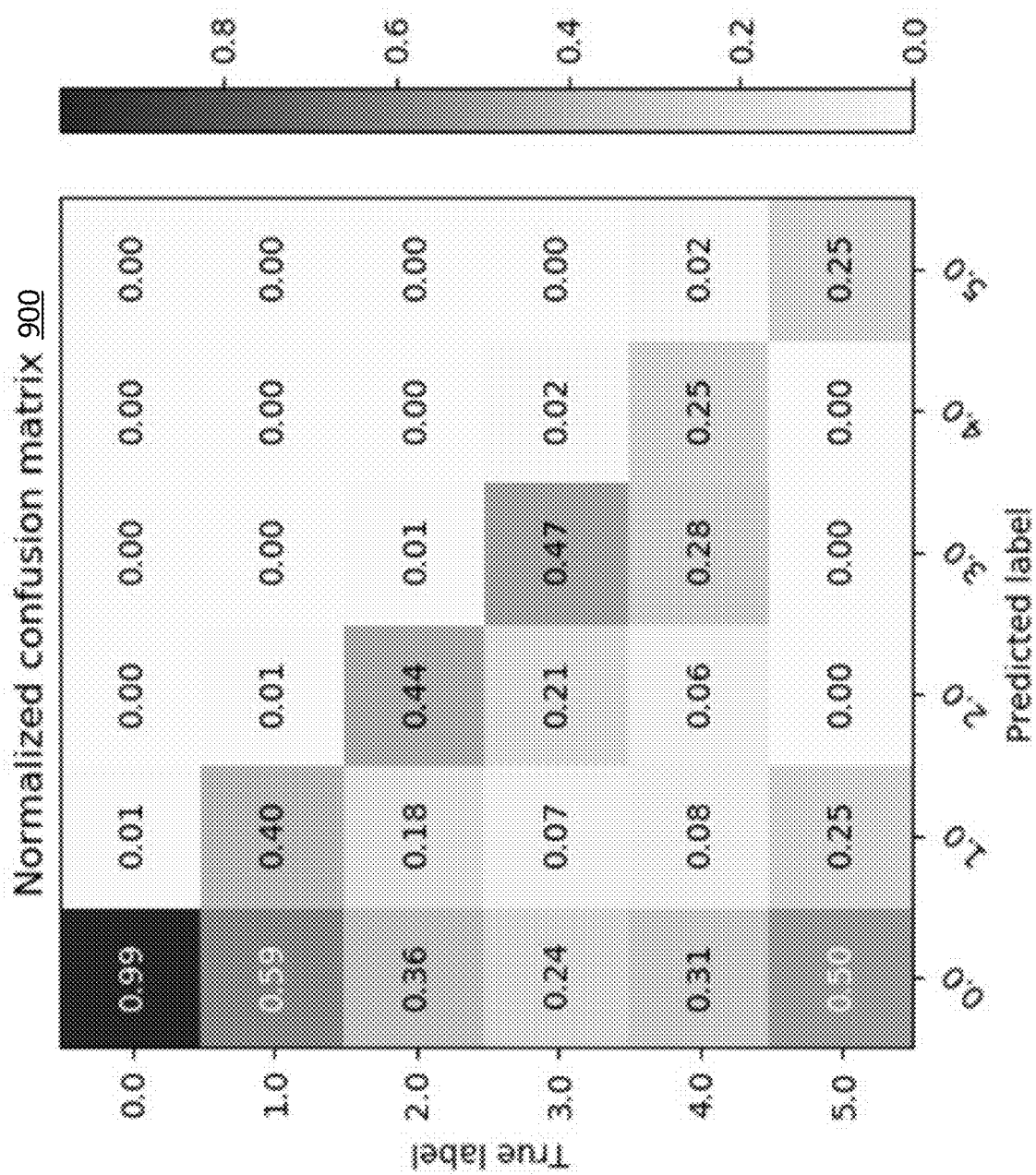
FIG. 10 is an illustrative example of a normalized confusion matrix.

By way of example, FIG. 10 illustrates an example of a normalized confusion matrix 900 generated in respect of a representative classifier model 402, indicating that although the representative classifier model is 99% effective at class "0" labelling, it is not very effective distinguishing between other label classes, and accordingly should not be used as a multi-class classifier for the target label set 1 to 5. The hierarchy should be structured so that basic units (BUs 205) that may have semantic tags that are easily confused by a specific classifier model will be routed along separate classifier node paths at a higher level in the hierarchical classier 212.

Referring again to FIG. 9, fusion module 814 can also obtain taxonomy information from one or more external knowledge bases 816, including for example the taxonomy structures used by known video sharing platforms such as the YouTube™ and Bilibili™ label hierarchies.

A human operation 801 can review the information collected by fusion module 814 to determine an appropriate hierarchical structure for hierarchical classifier 212, which can be defined in hierarchical architecture data 305. The hierarchical architecture data 305 can then be used by the hierarchical classification manager module 304 of a data analysis system 100 to implement a distributed hierarchical classifier 212.

Example of System Architecture

As noted above, video analysis system 100 can include or call on AI models, including AI classification models. Such AI models may for example include artificial neural network (NN) based models that are based on one or more of the following NN architectures: Convolution Neural Network (CNN), Recurrent Neural Network (RNN), Long Short-Term Memory (LSTM) and/or Transformer architectures. Other AI classification models can be based on decision tree algorithms, support vector machine algorithms, and logistic regression algorithms.

Figure 11:
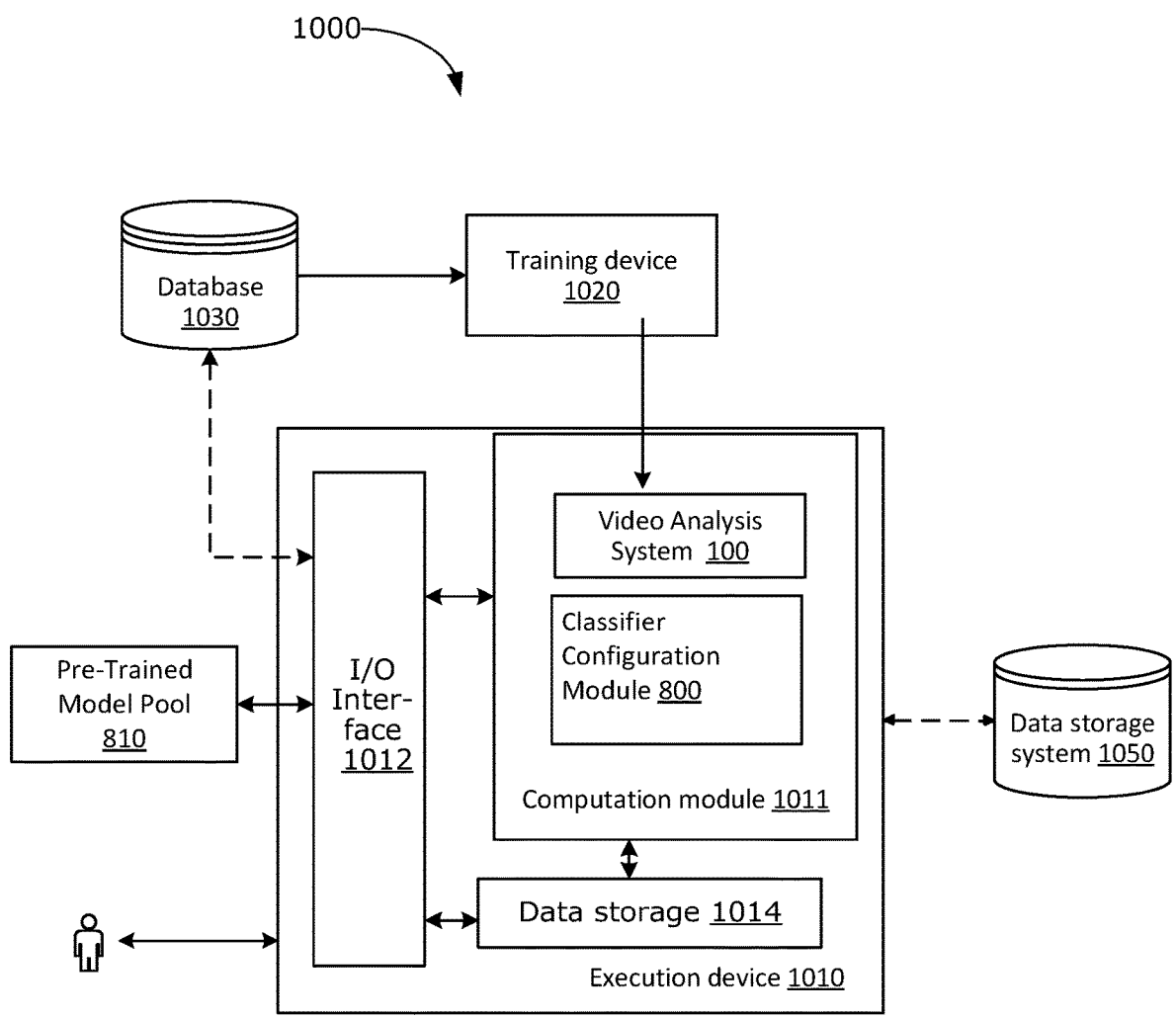
FIG. 11 is a block diagram of a system architecture that can be used to implement systems and methods described in this disclosure.

Reference is made to FIG. 11 which shows an example embodiment of the present disclosure as a system architecture 1000. The following description shall not be construed as a limitation to any examples of this disclosure. In example embodiments, system architecture 1000 includes a pre-trained model pool 810 that includes the AI classifier models 402 required for implementing hierarchical classifier 212. The AI classifier models 402 may be hosted by respective machines (e.g., respective execution devices 1010) in a distributed computing system. As described above, video analysis system 100 may include one or more AI based models in addition to AI classifier models 402. As shown in the system architecture 1000, training data may be stored in a database 1030. The database 1030 may contain, for example, training datasets that have been previously collected and commonly used for training models related to image tasks (e.g., image recognition).

One or more AI models of the system architecture 1000 may be trained using a training device 1020, using the training data maintained in the database 1030. The training device 1020 may use samples of the training data stored in the database 1030 to train one or more of the system architecture 1000. Additionally or alternatively, the training device 1020 may perform the training using training data obtained from other sources, such as a distributed storage (or cloud storage platform).

Modules of the video analysis system 100, and the classifier configuration module 800 may, in some examples, be applied to a computation module 1011 of an execution device 1010. The execution device 1010 may be a computer device such as a server, a cloud computing platform, or the like, which may be accessed by a user via a user device. In FIG. 11, the execution device 1010 is provided with an I/O interface 1012, which is configured to perform data interaction with external devices and systems (for example pre-trained model pool 810). The execution device 1010 in this example includes a data storage 1014, which may be a non-transitory system memory (e.g., a random access memory (RAM), a read-only memory (ROM), etc.) or a mass storage device (e.g., a solid state drive, a hard disk drive, etc.). The data storage 1014 may store data accessible by the computation module 1011. For example, the data storage 1014 may store captured images and/or generated images on the execution device 1010, separately from the computation module 1011.

In some examples, the execution device 1010 may optionally invoke data, code, or the like from an external data storage system 1050, to perform processing, or may store, in the data storage system 1050, data, an instruction, or the like obtained through corresponding processing.

It should be noted that FIG. 11 is merely a schematic diagram of an example system architecture 1000 according to an embodiment of the present disclosure. Relationships and interactions between the device, the component, the module, and the like that are shown in FIG. 11 are not intended to be limiting to the present disclosure.

Certain adaptations and modifications of the described embodiments can be made. Therefore, the above discussed embodiments are considered to be illustrative and not restrictive.

What is claimed is:

1. A computer implemented method of analyzing a video, comprising:
dividing the video into basic units, wherein the basic units are successive;
generating semantic tags for the basic units using a set of classifier nodes, the set of classifier nodes comprising a set of hierarchical classifier nodes that have a parent classifier node and a plurality of child classifier nodes, wherein in generating the semantic tags for the basic units, the basic units are each routed through selected child classifier nodes based on one or more predefined routing logic; and
generating a semantic topic for the video based on the semantic tags generated for the basic units.

2. The method of claim 1 wherein the child classifier nodes include a first child classifier node configured to determine first semantic tags for the basic units based on audio data included in the basic units, and a second child classifier node configured to determine second semantic tags for the basic units based on image data included in the basic units, and the basic units are selectively routed for semantic tagging to either the first child classifier node or to the second child classifier node based on the classification of the basic units by the parent classifier node.

3. The method of claim 1 wherein the set of hierarchical classifier nodes comprise a plurality of different types of classifier nodes, and the set of hierarchical classifier nodes are distributed among multiple computer devices, and generating the semantic tags for the basic units comprises selectively routing the basic units to selected computer devices and receiving at least some of the semantic tags from the selected computer devices.

4. The method of claim 1 wherein the set of hierarchical classifier nodes includes a first classifier node that receives at least a first basic unit of the basic units, the first classifier node comprises: multiple classifier models that are each configured to generate a respective semantic label for the first basic unit, and generating semantic tags for the basic units comprises determining a first semantic tag for the first basic unit based on one or more of the respective semantic labels generated by one or more of the multiple classifier models.

5. The method of claim 4 wherein the multiple classifier models include a first classifier model configured to generate a first respective semantic label for the first basic unit based on audio data included in the first basic unit, and a second classifier model configured to generate a second respective semantic label for the first basic unit based on image data included in the first basic unit.

6. The method of claim 4 wherein each of the multiple classifier models is configured to generate, for the first basic unit, a plurality of candidate semantic labels each having an associated confidence value, the plurality of candidate semantic labels generated by each of the multiple classifier models forming a pool of candidate semantic labels, wherein the integration logic determines the semantic tag for the first basic unit from the pool of candidate semantic labels based on one or more of: (i) a magnitude of a confidence value; (ii) a computed average of confidence values; (iii) a distribution of confidence values.

7. The method of claim 4 wherein the first classifier model of the multiple classifier models is configured to generate, for the first basic unit, a candidate semantic label having an associated confidence value, and when the associated confidence value is determined to meet a defined threshold value, determining the first semantic tag comprises selecting the candidate semantic label as the semantic tag for the first basic unit, and when the associated confidence value is determined to not meet the defined threshold value, determining a first semantic tag comprises routing the first basic unit to at least a second classifier model of the multiple classifier models to generate, for the first basic unit, one or more further candidate semantic labels, and determining the first semantic tag for the first basic unit is based on the one or more further candidate semantic labels.

8. The method of claim 1 comprising, for each respective basic unit, tracking an identity of each of the classifier nodes that the respective basic unit has been routed through and the semantic tags generated for the respective basic unit by the classifier nodes that the respective basic unit has been routed through.

9. The method of claim 8 comprising generating a knowledge graph representing one or more of the respective basic units, the knowledge graph including information about the semantic tags and time stamps associated with the semantic tags, and wherein generating a semantic topic for the video comprises comparing the knowledge graphs with a database of known query graphs that each has an associated semantic topic.

10. A video analysis system comprising:
one or more processor devices; and
one or more memories storing machine-executable instructions, which when executed by the one or more processor devices, cause the system to:
divide a video into basic units, wherein the basic units are successive;
generate semantic tags for the basic units using a set of classifier nodes, the set of classifier nodes comprising a set of hierarchical classifier nodes that have a parent classifier node and a plurality of child classifier nodes, wherein in generating semantic tags for the basic units, the basic units are each routed through selected child classifier nodes based on one or more predefined routing logic; and
generate a semantic topic for the video based on the semantic tags generated for the basic units.

11. The system of claim 10, wherein the set of hierarchical classifier nodes comprise a plurality of different classifier nodes that are each configured to process different types of data modalities, and the set of hierarchical classifier nodes are distributed among multiple computer devices.

12. The system of claim 11 wherein the set of hierarchical classifier nodes include a first classifier node that comprises: multiple classifier models that are each configured to generate a respective semantic label for at least a first basic unit of the basic units, and integration logic for determining the semantic tag for the first basic unit based on one or more of the respective semantic labels generated by one or more of the multiple classifier models.

13. The system of claim 12 wherein the multiple classifier models include a first classifier model configured to generate a first respective semantic label for the first basic unit based on audio data included in the first basic unit, and a second classifier model configured to generate a second respective semantic label for the first basic unit based on image data included in the first basic unit.

14. The system of claim 12 wherein each of the multiple classifier models is configured to generate, for the first basic unit, a plurality of candidate semantic labels each having an associated confidence value, the plurality of candidate semantic labels generated by each of the multiple classifier models forming a pool of candidate semantic labels, wherein the integration logic determines the semantic tag for the first basic unit from the pool of candidate semantic labels based on one or more of: (i) a magnitude of a confidence value; (ii) a computed average of confidence values; (iii) a distribution of confidence values.

15. The system of claim 12 wherein the first classifier model of the multiple classifier models is configured to generate, for the first basic unit, a candidate semantic label having an associated confidence value, and when the associated confidence value is determined to meet a defined threshold value, the integration logic selects the first candidate semantic label as the semantic tag for the first basic unit, and when the associated confidence value is determined to not meet the defined threshold value, the integration logic routes the first basic unit to at least a second classifier model of the multiple classifier models to generate, for the first basic unit, one or more further candidate semantic labels for consideration by the integration logic when determining the semantic tag for the first basic unit.

16. The system of claim 10 wherein the machine-executable instructions, when executed by the one or more processing devices, further cause the system to:
for each respective basic unit:
track an identity of each of the classifier nodes that the respective basic unit has been routed through and the semantic tags determined for the respective basic unit by the classifier nodes that the respective basic unit has been routed through, and;
generate a knowledge graph representing one or more of the respective basic units, the knowledge graph including information about the semantic tags and time stamps associated with the semantic tags.

17. The system of claim 10 wherein the machine-executable instructions, when executed by the one or more processing devices, further cause the system to:
route the basic units through selected child classifier nodes based on the hierarchical architecture data stored in the one or more memories, the hierarchical architecture data defining a hierarchical organization of the set of hierarchical classifier nodes and defining the one or more predefined routing rules for routing the basic units through selected child classifier nodes.

18. A non-transitory computer readable medium storing software instructions for configuring an execution device to analyze a video by:
dividing the video into basic units, wherein the basic units are successive;
generating semantic tags for the basic units using a set of classifier nodes, the set of classifier nodes comprising a set of hierarchical classifier nodes that have a parent classifier node and a plurality of child classifier nodes, wherein in generating semantic tags for the basic units, the basic units are each routed through selected child classifier nodes based on one or more predefined routing logic; and
generating a semantic topic for the video based on the semantic tags generated for the basic units.

* * * * *